Figure 1:
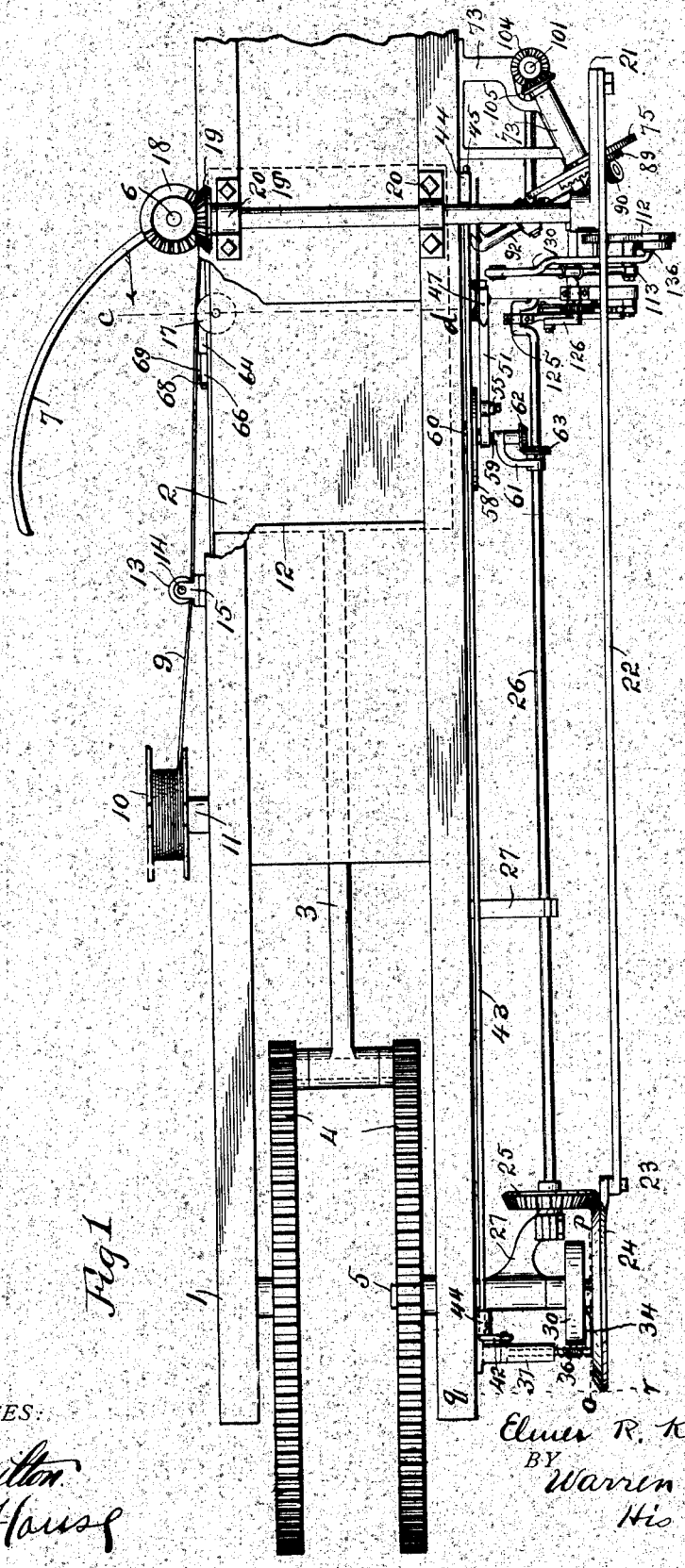

E. R. KOONTZ.
MECHANISM FOR BALE TYING.
APPLICATION FILED SEPT. 7, 1909.

1,015,327.

Patented Jan. 23, 1912.
12 SHEETS—SHEET 1.

WITNESSES:
R. Hamilton
E. B. House

INVENTOR
Elmer R. Koontz
BY Warren D. House
His ATTORNEY.

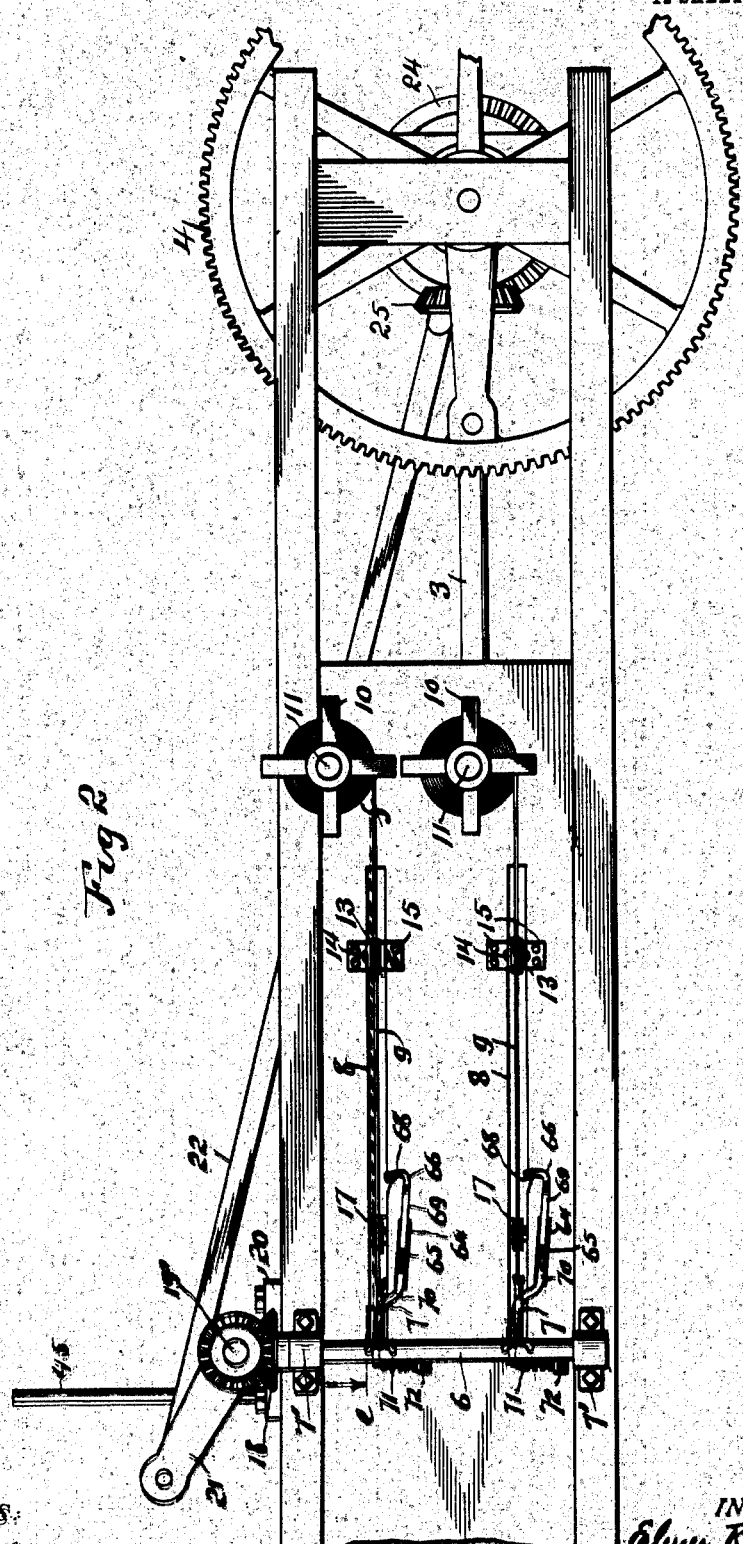

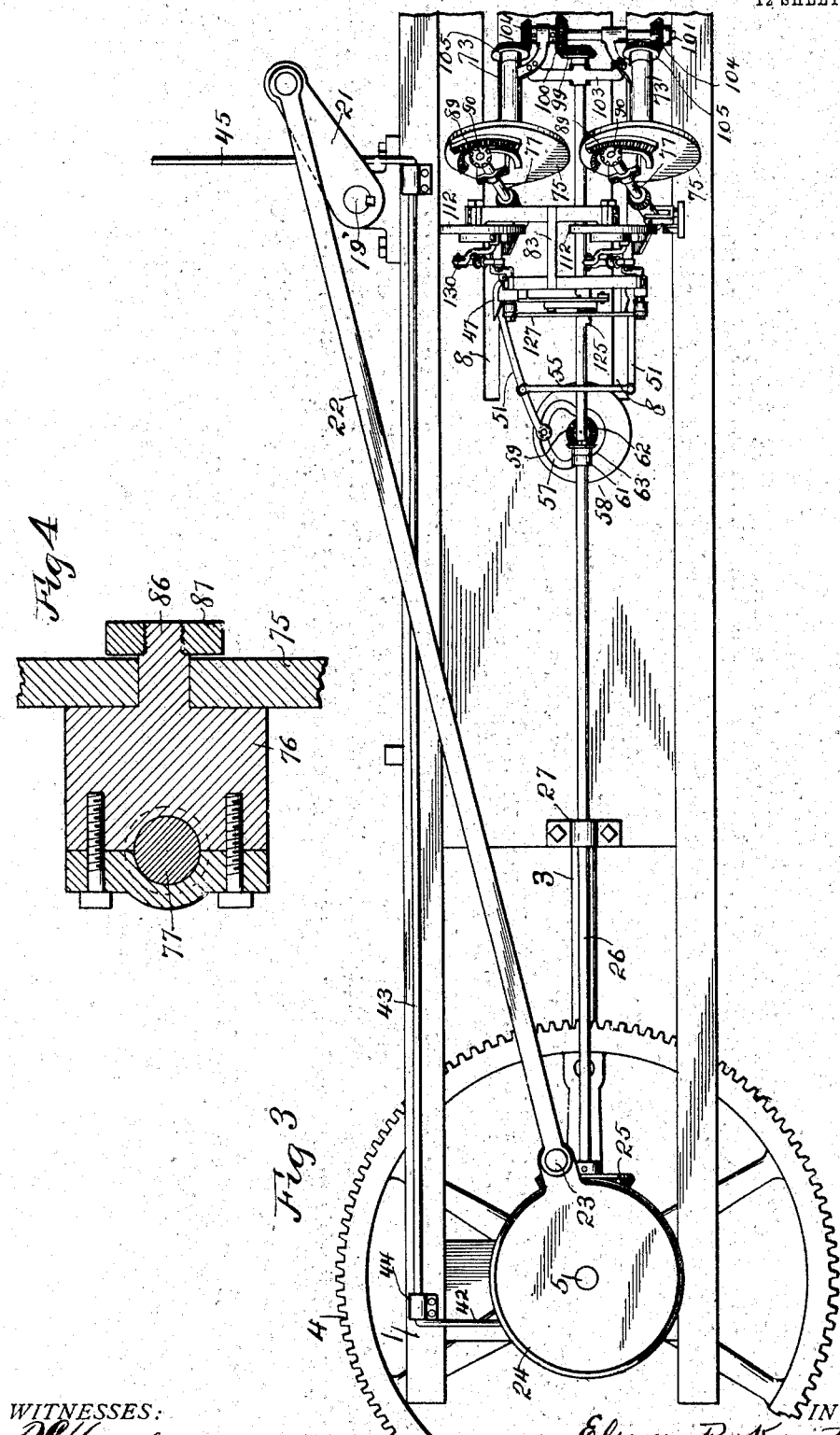

E. R. KOONTZ.
MECHANISM FOR BALE TYING.
APPLICATION FILED SEPT. 7, 1909.
1,015,327.
Patented Jan. 23, 1912.
12 SHEETS—SHEET 4.
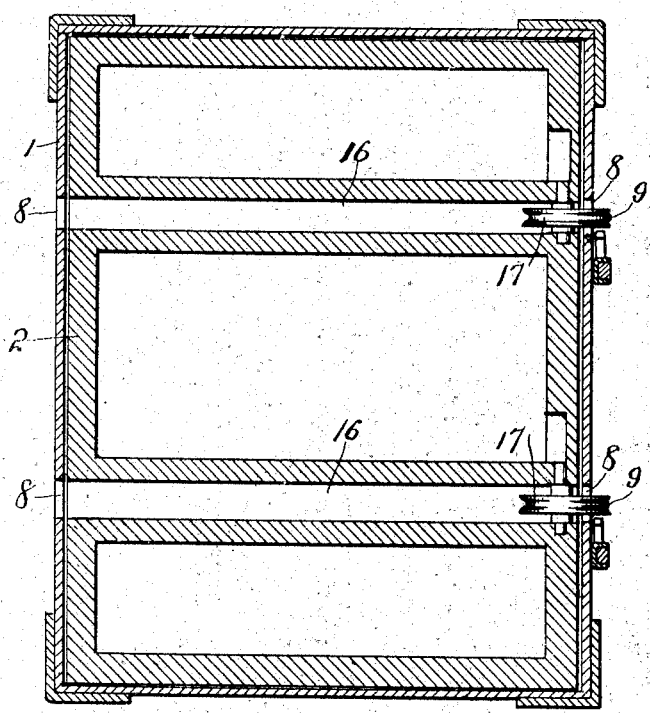
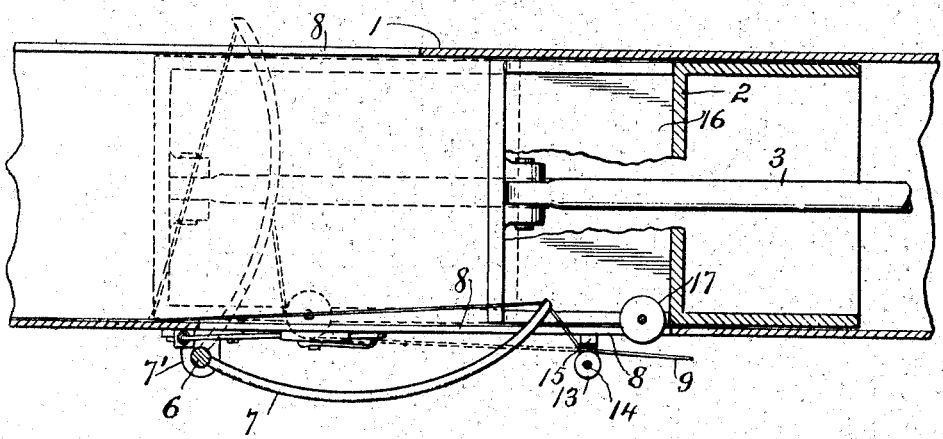
WITNESSES:
R. L. Hamilton
E. B. House
INVENTOR.
Elmer R. Koontz
BY Warren L. House
His ATTORNEY.

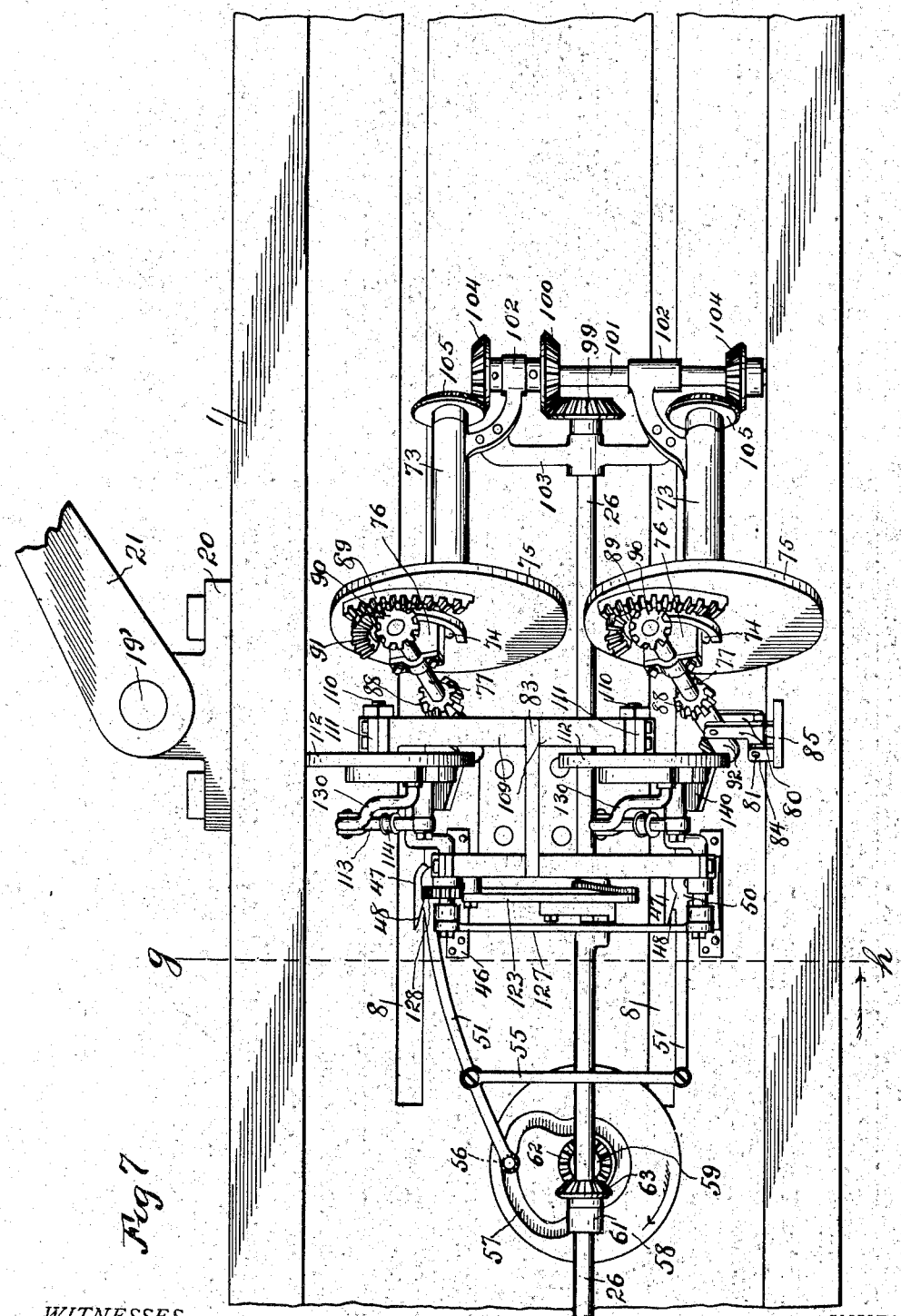

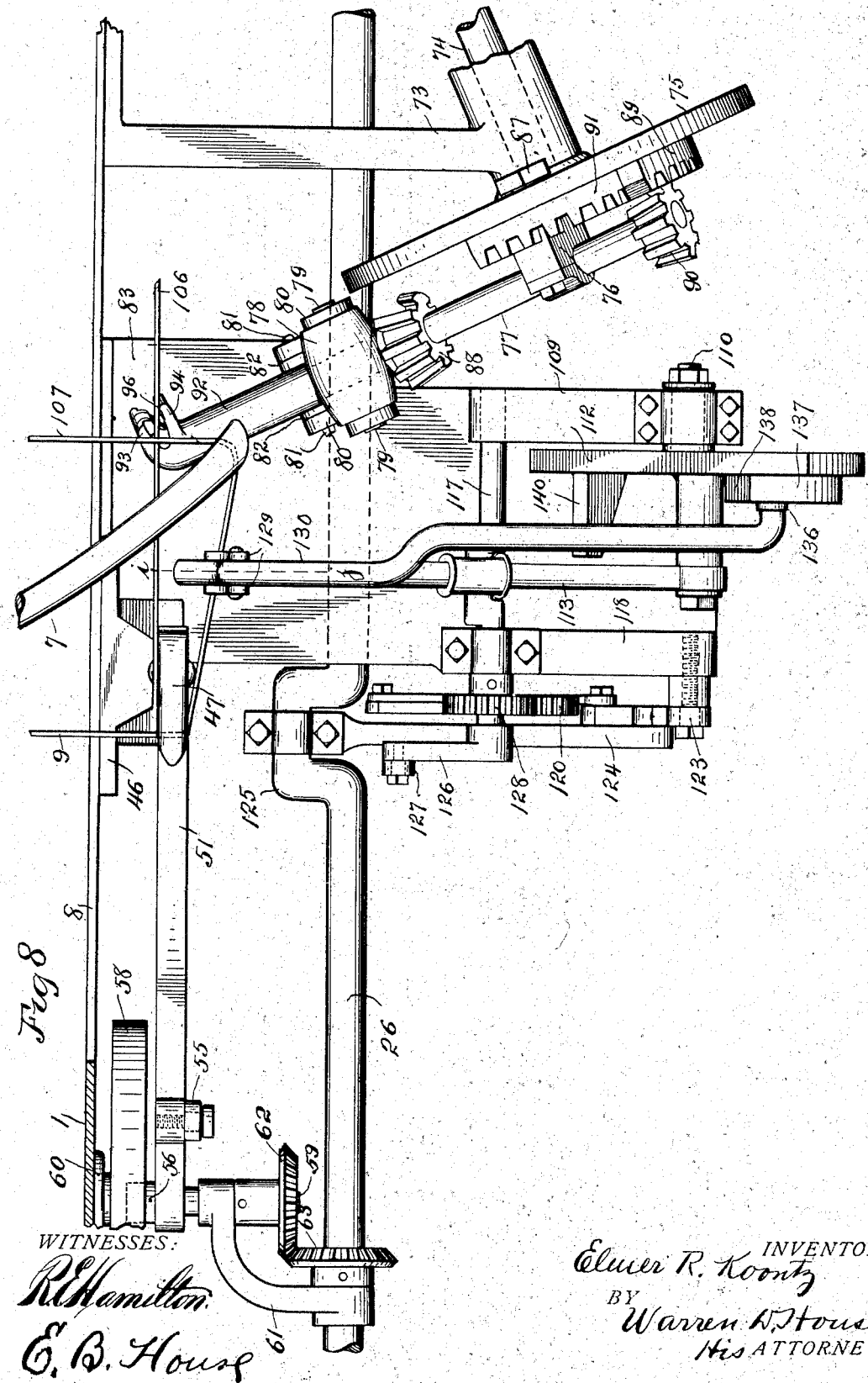

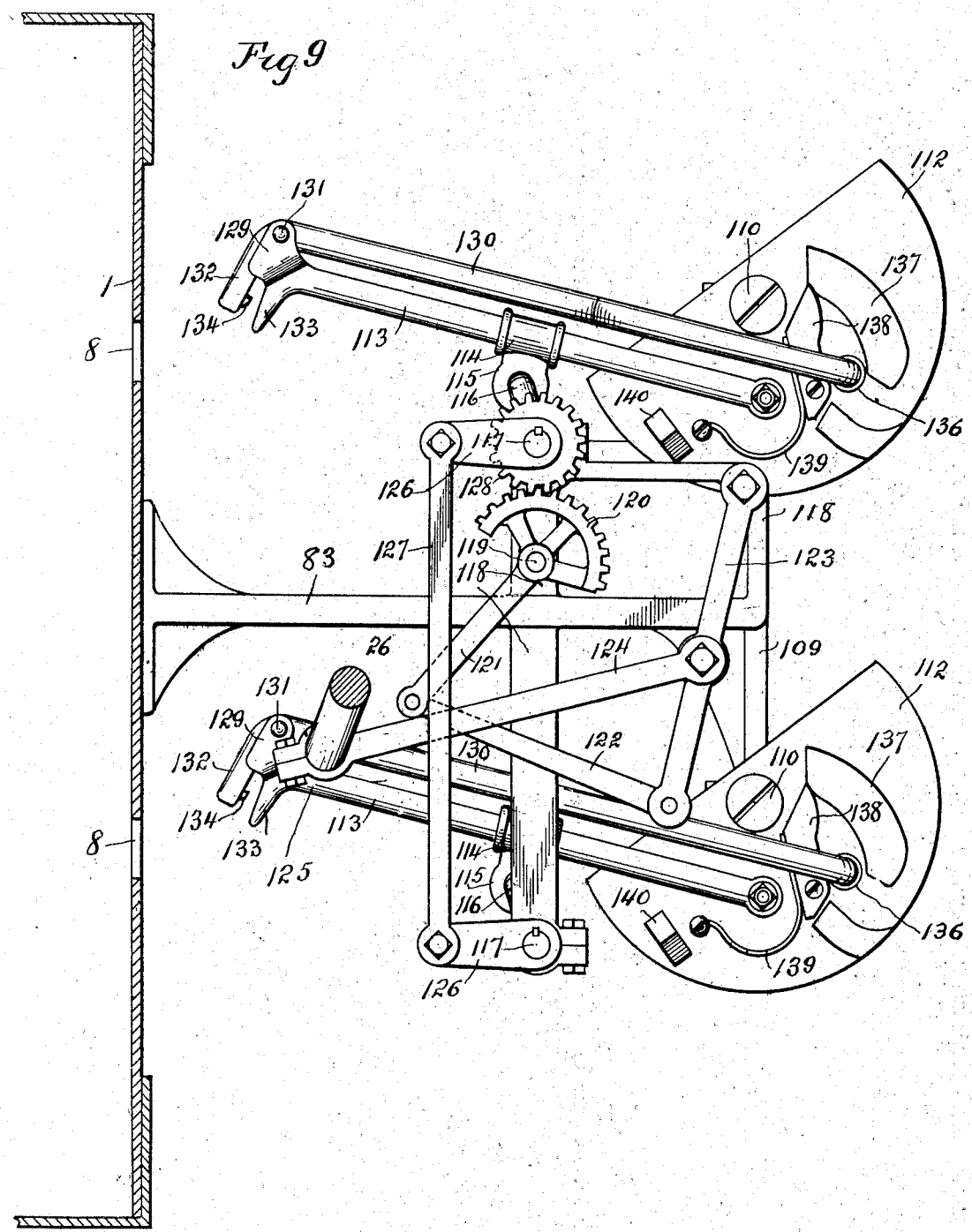

E. R. KOONTZ.
MECHANISM FOR BALE TYING.
APPLICATION FILED SEPT. 7, 1909.
1,015,327.
Patented Jan. 23, 1912.
12 SHEETS—SHEET 8.
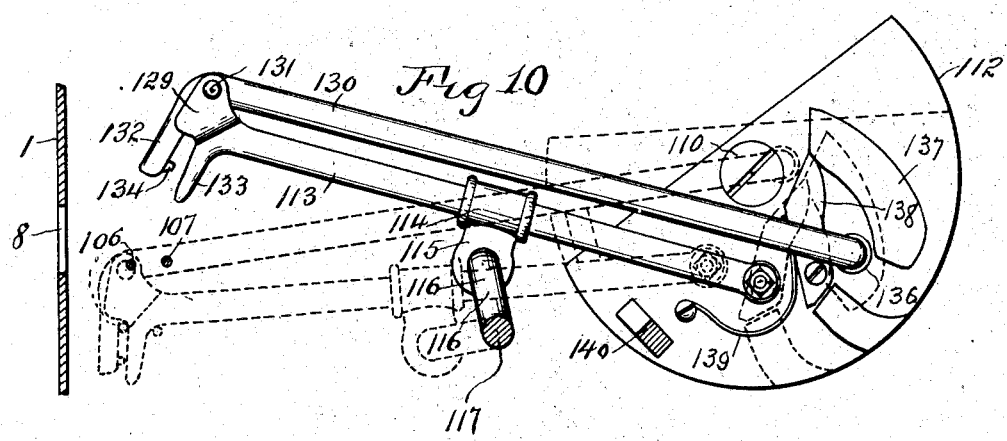
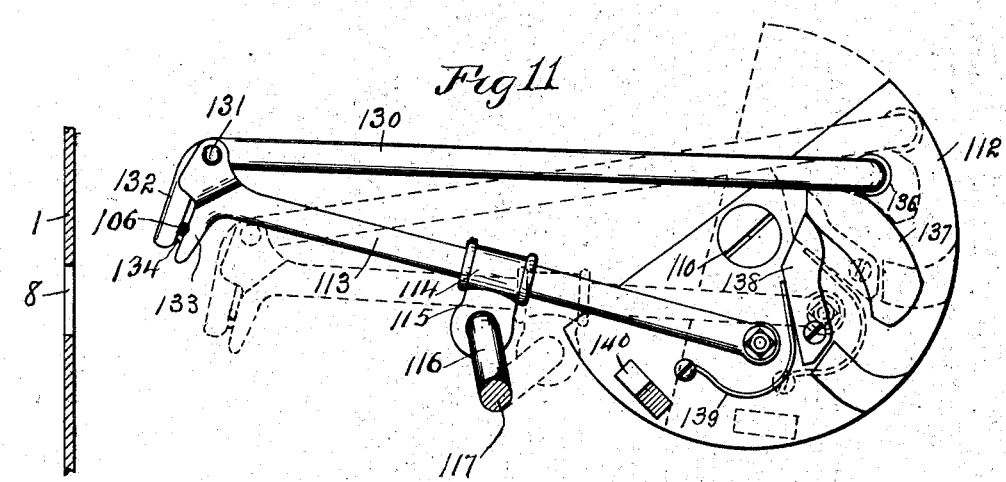
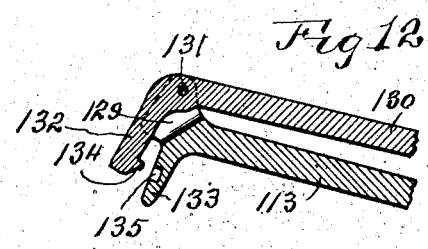

E. R. KOONTZ.
MECHANISM FOR BALE TYING.
APPLICATION FILED SEPT. 7, 1909.
1,015,327.
Patented Jan. 23, 1912.
12 SHEETS—SHEET 9.
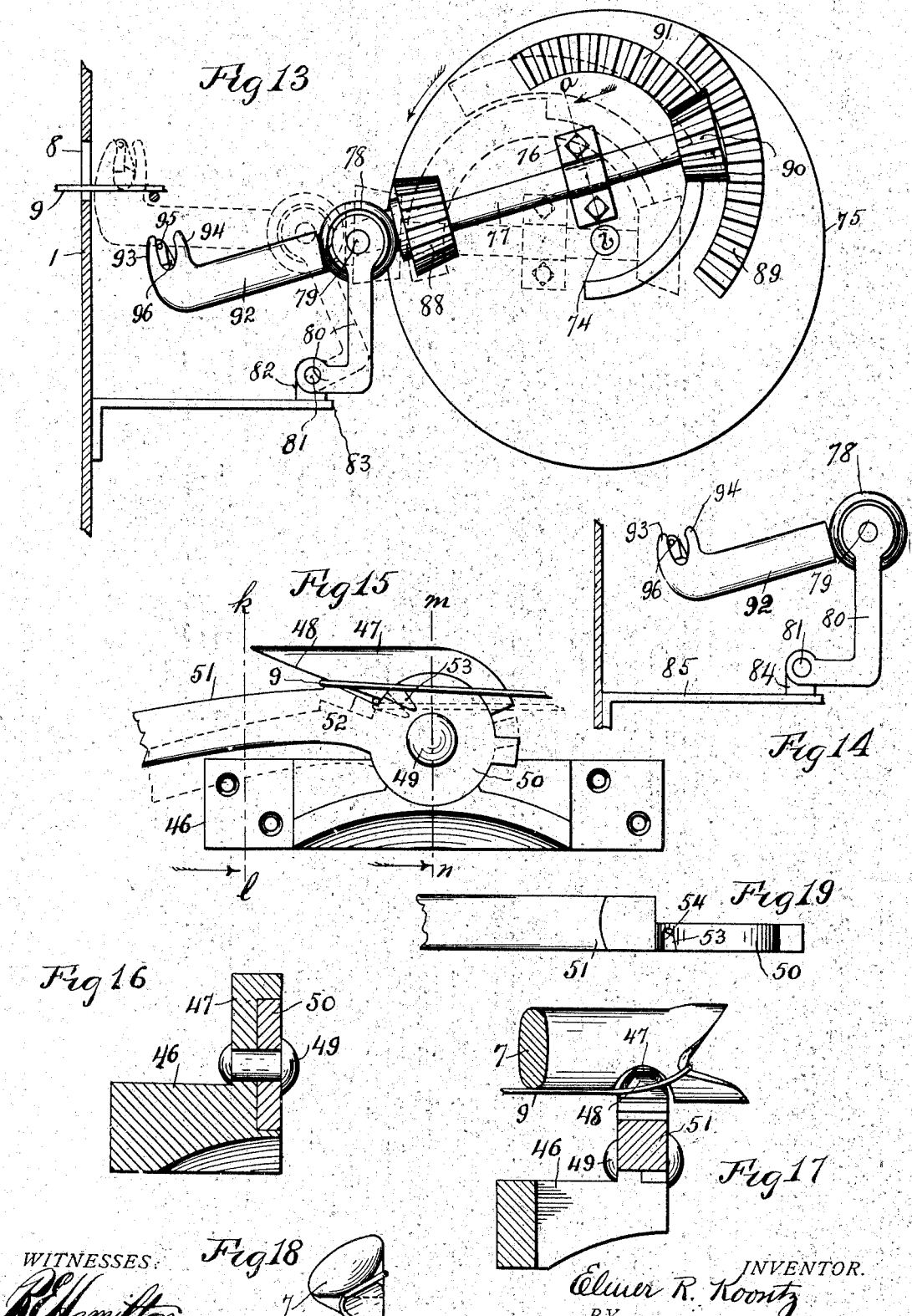
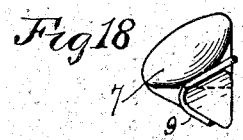

E. R. KOONTZ.
MECHANISM FOR BALE TYING.
APPLICATION FILED SEPT. 7, 1909.
1,015,327.
Patented Jan. 23, 1912.
12 SHEETS—SHEET 10.
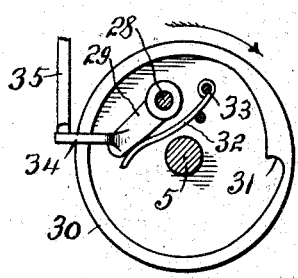
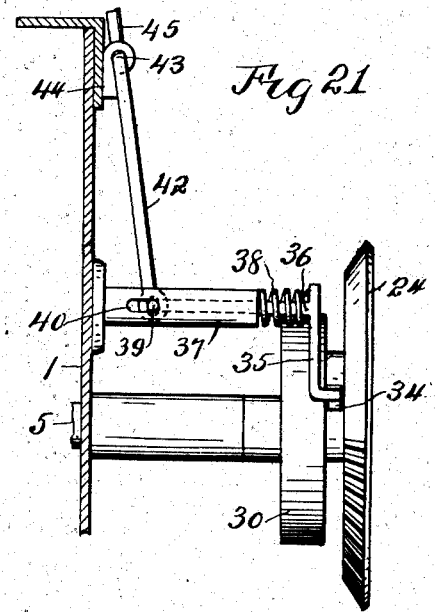
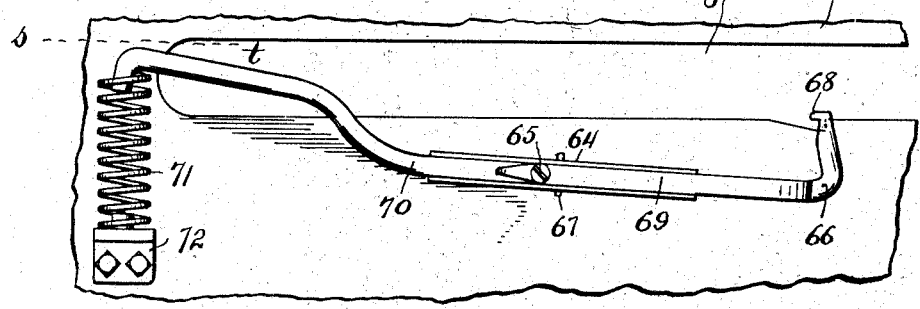
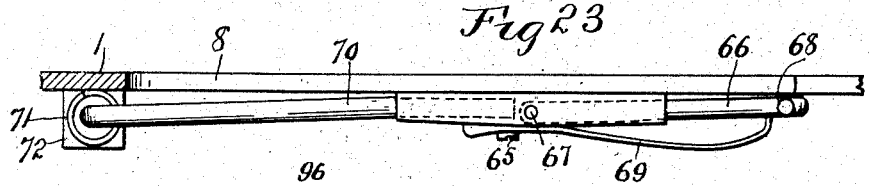
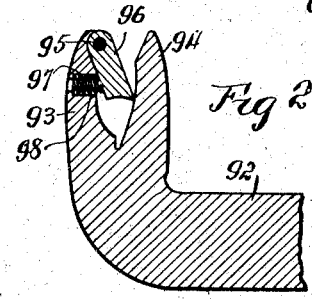
WITNESSES:
R. C. Hamilton
E. B. House
INVENTOR.
Elmer R. Koontz
BY Warren A. House
His ATTORNEY.

E. R. KOONTZ.
MECHANISM FOR BALE TYING.
APPLICATION FILED SEPT. 7, 1909.
1,015,327.
Patented Jan. 23, 1912.
12 SHEETS—SHEET 11.
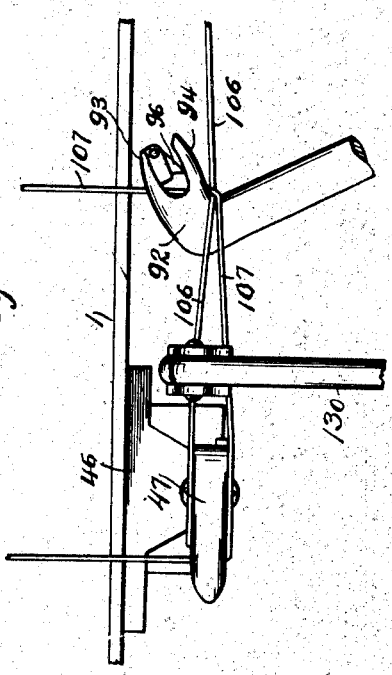
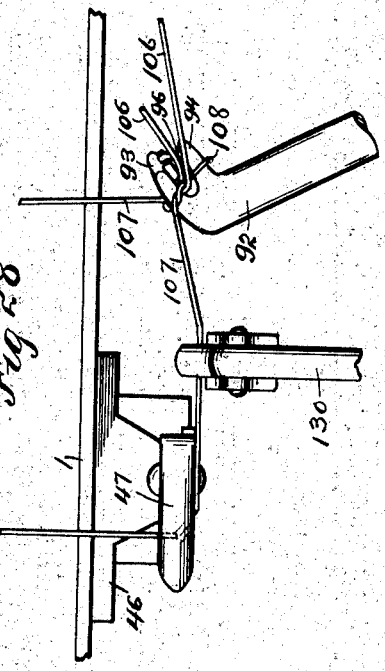
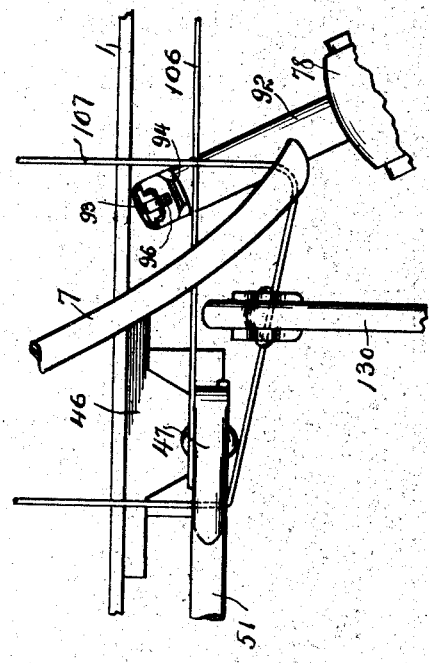
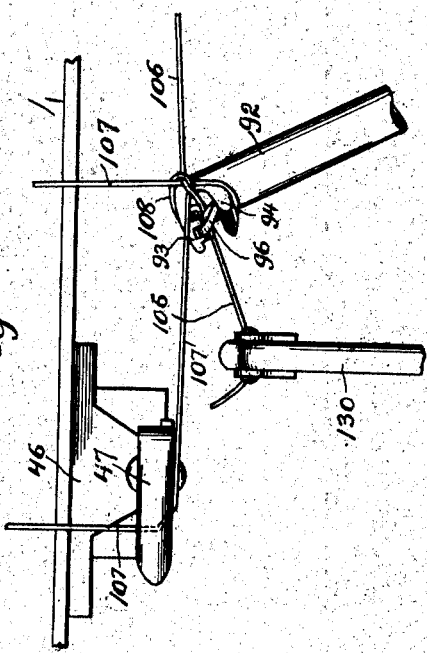
WITNESSES:
R. Hamilton.
E. B. House
INVENTOR.
Elmer R. Koontz
BY
Warren D. House
His ATTORNEY.

E. R. KOONTZ.
MECHANISM FOR BALE TYING.
APPLICATION FILED SEPT. 7, 1909.
1,015,327.
Patented Jan. 23, 1912.
12 SHEETS—SHEET 12.
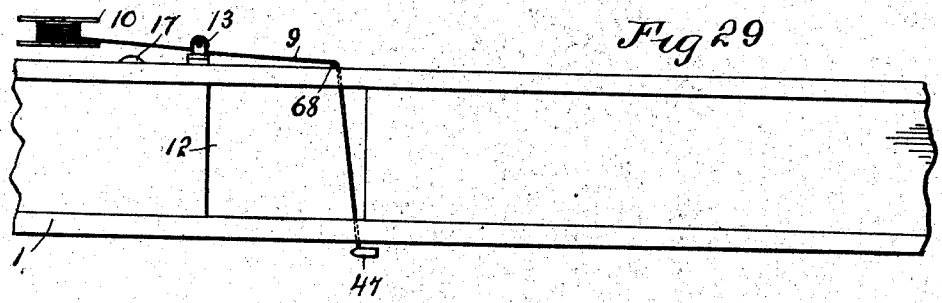
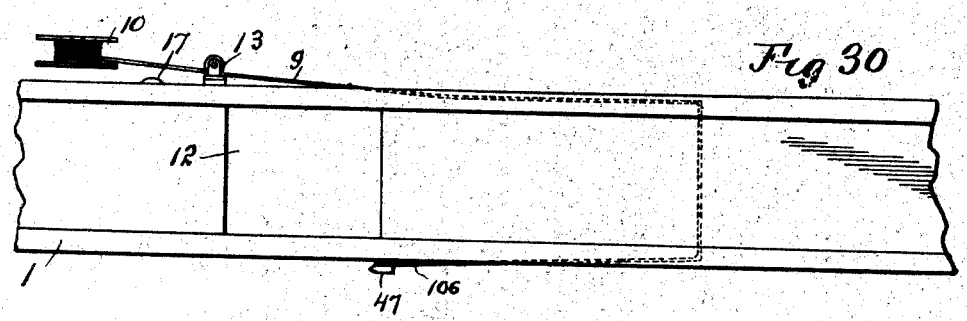
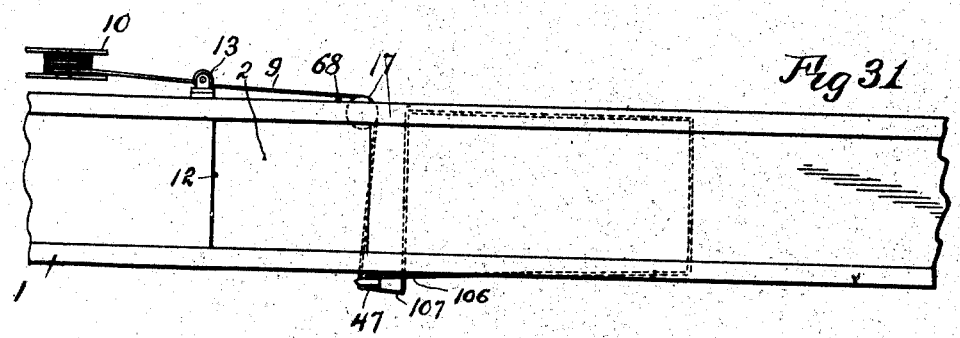
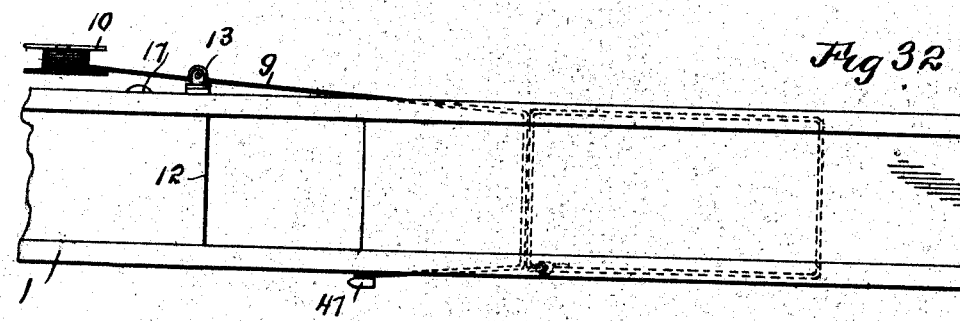
WITNESSES:
R. E. Hamilton
E. B. House
INVENTOR.
Elmer R. Koontz
BY Warren D. House
His ATTORNEY.

UNITED STATES PATENT OFFICE.

ELMER R. KOONTZ, OF RICHARDS, MISSOURI.

MECHANISM FOR BALE-TYING.

1,015,327.  Specification of Letters Patent.  Patented Jan. 23, 1912.

Application filed September 7, 1909. Serial No. 516,448.

*To all whom it may concern:*

Be it known that I, ELMER R. KOONTZ, a citizen of the United States, residing at Richards, in the county of Vernon and State of Missouri, have invented certain new and useful Improvements in Mechanisms for Bale-Tying, of which the following is a specification.

My invention relates to improvements in mechanisms for bale tying.

It relates particularly to methods of and mechanisms for tying knots in wires employed to bind hay and cotton bales.

One object of my invention is to provide an apparatus for first knotting the binding wires which encircle the bale and then cut the wires intermediate the knots and the rolls from which the wires are drawn. By first tying the knots, as distinguished from twisting the wires, and then cutting the wires, the wires are held firmly under perfect control and are less liable to slip during the knotting operations. Wires which are twisted together are liable to be untwisted owing to the great pressure exerted by the compressed material forming the bales.

My invention provides further mechanism by which the needles carrying the wires are reciprocated across the baling chamber during the backward and forward movement of the plunger, as distinguished from needles which are passed across the baling chamber at the forward end of the stroke of the plunger. Such devices are not commercially successful owing to the rapidity with which the needles must move. In machines in which the plunger is stopped at its forward position to permit the passage of the needles, much time is lost and the capacity of the machine is thereby reduced. By passing the needles across the chamber during the forward and backward movements, the speed of movement of the needles can be comparatively slow, thereby eliminating danger of breakage of the wires.

My invention provides an improved wire cutting and clamping mechanism and an improved knot tying mechanism.

Other novel features of my invention are hereinafter described and claimed.

In the accompanying drawings which illustrate my invention—Figure 1 is a plan view partly broken away. Fig. 2 is an elevation of one side of the baling machine. Fig. 3 is an elevation of the side of the machine opposite to that shown in Fig. 2. Fig. 4 is a cross section taken on the dotted line *a—b* of Fig. 13. Fig. 5 is a cross section on the dotted line *c—d* of Fig. 1. Fig. 6 is a horizontal section on the plane of the dotted line *e—f* of Fig. 2. Fig. 7 is an enlarged side elevation of a portion of the baling chamber and the cutting and knotting mechanism. Fig. 8 is a top view, enlarged, of what is shown in Fig. 7. Fig. 9 is a vertical section taken on the dotted line *g—h* of Fig. 7, some of the parts being removed. Fig. 10 is an elevation, showing in solid and dotted lines respectively, two positions of one of the wire positioning and holding devices. Fig. 11 is an elevation of the parts shown in Fig. 10, said parts being shown in the solid and dotted lines in two other positions. Fig. 12 is a vertical sectional view on the dotted line *i—j* of Fig. 8. Fig. 13 is an elevation of a portion of one of the knotting mechanisms shown in two positions, in dotted and solid lines respectively. Fig. 14 is an elevation of a portion of one of the other novel mechanisms. Fig. 15 is a side elevation enlarged, of a portion of one of the wire cutting mechanisms. Fig. 16 is a vertical section on the dotted line *m—n* of Fig. 15. Fig. 17 is a vertical section taken on a vertical plane corresponding to the dotted line *k—l* of Fig. 15, a portion of one of the wire carrying needles being shown. Fig. 18 is an elevation of the outer end of one of the needles. Fig. 19 is a plan view, detached, of a portion of one of the wire cutting levers. Fig. 20 is a vertical section on the dotted line *o—p* of Fig. 1. Fig. 21 is a vertical section on the dotted line *q—r* of Fig. 1. Fig. 22 is an enlarged side elevation of one of the wire holding devices secured to the baling chamber. Fig. 23 is a horizontal section taken on the dotted line *s—t* of Fig. 22. Fig. 24 is an enlarged longitudinal sectional view of the head of one of the knotting devices. Figs. 25, 26, 27 and 28 show respectively in plan views, four different positions of a portion of the cutting and knotting mechanisms. Figs. 29, 30, 31 and 32 are plan views showing respectively four different positions of the wire and a portion of the baling chamber and some of the parts connected therewith. Fig. 33 is a representation of the knot made in the baling wire by the knotting mechanism.

Similar characters of reference denote similar parts.

1 denotes the baling chamber of an ordinary hay baling machine, 2 the plunger reciprocative therein, 3 the plunger rod the rear end of which is pivoted to two driving gears 4, which may be driven by any suitable means.

5 denotes a horizontal shaft, secured to one of the gears 4 and rotatively mounted in one side wall of the baling chamber 1.

I will now describe the needles for carrying the wire through the baling chamber at the rear of the bales, and the mechanism for operating said needles: Referring particularly to Figs. 1, 2, 3, 20 and 21, 6 denotes a rotary rock shaft mounted vertically in bearings 7', secured to one side of the baling chamber 1. Two horizontal curved needles 7, are secured at one set of ends, one above the other, to the shaft 6, said needles being adapted, when the shaft is rocked to and fro, to pass through longitudinal slots 8 provided in opposite sides of the baling chamber for the purpose of carrying the baling wire 9 through the baling chamber at the rear of the bales, to wire clamping devices hereinafter described, disposed at the opposite side of the baling chamber. The wires 9 are drawn from two reels 10, which are rotatively mounted respectively on horizontal studs 11, the inner ends of which are secured to the vertical side of a baling chamber 1, to which are secured the bearings 7', as shown in Fig. 2.

12 denotes the opening in the top of the baling chamber through which the material to be fed is inserted in the baling chamber, see Fig. 1. Two horizontal rollers 13, for guiding the wire 9, are rotatively mounted on vertical pivots 14 respectively, the upper and lower ends of which are secured in brackets 15, fastened at the rear of the opening 12 to the vertical side of the chamber 1, to which are secured the bearings 7, as shown in Figs. 1 and 2. The forward end of the plunger 2 is provided with two longitudinal horizontal slots 16, which extend transversely through the plunger 2 in the same horizontal planes respectively in which are located the slots 8. Two horizontal rollers 17, are rotatively mounted in the slots 16 respectively of the plunger 2 and extend laterally respectively through adjacent slots 8. The rollers 17 are peripherally grooved so as to receive therein the wires 9. The shaft 6 is rocked by the following described mechanism:—Secured to the upper end of the shaft 6 is segmental bevel gear wheel 18, which meshes with a bevel gear wheel 19, rigidly secured to one end of a horizontal shaft 19', which is rotatively mounted in bearings 20, which are secured upon the upper side of the baling chamber 1. Secured to the other end of the shaft 19' is a crank arm 21, to which is pivoted the forward end of a rearwardly extending rod 22, the rear end of which is pivoted to a crank pin 23, secured eccentrically and horizontally to a vertical bevel gear wheel 24 which is rotatively mounted on the shaft 5. The bevel gear wheel 24 is provided on a portion only of its periphery, with teeth adapted to mesh with the teeth of a bevel gear wheel 25 which is rigidly secured to a horizontal, longitudinal shaft 26, rotatively mounted in suitable bearings 27, secured to the side of the baling chamber 1, in which is rotatively mounted the shaft 5. For rotating the gear 24, it has secured to its inner side a horizontal stud 28 on which is pivoted a pawl 29 which is located in the recessed outer side of a disk 30 which is rigidly secured to the shaft 5. In the inner periphery of the recessed outer end of the disk 30 is provided a notch 31 adapted to receive the outer end of the pawl 29. A flat spring 32 is secured at one end to a horizontal pin 33 secured to the inner side of the gear 24, the opposite end of the spring bearing upon the pawl 29 so as to force the pawl into the notch 31. The pawl 29 is provided with an arm 34 which projects beyond the periphery of the disk 30 and is adapted to strike a crank arm 35 provided at the outer end of a horizontal bar 36, which is slidable longitudinally in a bearing 37 the inner end of which is secured to the baling chamber 1. A coil spring 38 encircles the bar 36 and has its outer end bearing against the arm 35, and its inner end bearing against the bearing 37. The spring 38 normally forces the bar 36 to a position in which the arm 35 will be disposed in the path of movement of the arm 34. In such position the arm 35 will hold the arm 34 and the pawl 29 will be forced against the pressure of the spring 32 from the notch 31, thereby releasing the gear and stopping its rotation. To retract the bar 36, it has secured transversely in it a horizontal pin 39, which extends through a horizontal transverse hole 40 provided in the bearing 37. One end of the pin 39 is pivoted to a crank arm 42 of a horizontal rock shaft 43 mounted in bearings 44 secured to the adjacent side of the baling chamber. The rock shaft 43 is provided with a crank arm 45 by which the shaft may be operated to withdraw the bar 36 to release the gear pawl 29 from engagement with the arm 35. When this is done the pawl enters the notch 31 of the rotating disk 30 and the shaft 6 is rocked so as to swing the needles 7 from the position shown in Fig. 1 to the position shown in dotted lines in Fig. 6 and in solid lines in Fig. 8, through the intermediacy of the gear 24, rod 22, crank 21, shaft 19', gear 19 and segmental gear 18. As soon as the rock shaft 43 has been rocked to retract the bar 36, the rock shaft is released, so that the spring 38 will force the bar 36 into a position in which the arm 35 will engage the arm 34 and stop the rotation of the gear 24. At this time the needles 7 will have been retracted to the position shown in Fig. 1.

The disposition of the notch 31 relative to the plunger rod 3, is such that when the plunger 2 moves forward and the rock shaft 43 is rocked, the mechanism just described, connected with the gear 24, will rock the shaft 6 from the position shown in Fig. 1, so that the needles 7 will move through the slots 8 of the baling chamber and the slots 16 of the plunger, to the position shown in dotted lines in Fig. 6 and in solid lines in Figs. 8 and 25. In moving transversely through said slots toward the position shown in Fig. 8, the notched outer ends of the needles 7 will engage the wire 9 and will fold the wire through the chamber behind the formed bale and deposit it in the jaws of clamping and cutting mechanism located at the side of the baling chamber opposite the side adjacent to the rock shaft 6.

I will now describe the clamping and cutting mechanism just referred to:—Adjacent the slots 8, are located two sets of clamping jaws for receiving and holding the wires deposited respectively between them by the needles 7. Referring particularly to Figs. 7, 8, 9, 15, 16, 17 and 19, the construction of the two clamping mechanisms is best shown. The two clamping mechanisms are identical in construction so that a description of one will suffice for both:—Rigidly secured to the side of the baling chamber 1, below an adjacent slot 8, is a horizontal plate 46, which is provided with a vertical stationary jaw 47, having a downwardly and forwardly beveled rear end 48, best shown in Fig. 15. The outer side of the jaw 47 is provided with a circular recess in which is rotatively fitted, upon a horizontal pin 49, secured to the jaws 47, the circular forward end 50, of a rearwardly extending lever 51. The lever 51 is provided on its upper side with a flat portion 52 which forms a clamping jaw which coöperates with the jaw 47, to clamp and hold the wire 9. The circular portion 50 is provided with a peripheral notch 53, best shown in Figs. 15 and 19, which is adapted to receive the wire 9 when the lever 51 is downwardly swung. One edge 54 of said notch, is a cutting edge which coöperates with the lower cutting edge of the inclined portion 48 of the jaw 47 to cut the wire 9 when the lever 51 is upwardly swung. The two levers 51 are disposed one above the other and are connected with each other by a vertical rod 55, the upper and lower ends of which are respectively pivoted to said levers so that the two sets of jaws are simultaneously operated. For swinging the levers 51 upward and downward at the proper times and to retain them in the open and closed positions, the proper length of time, the upper lever 51 has mounted on its rear end and inner side, as shown in Fig. 8, a roller 56, which is located in an endless groove 57, provided on the outer side of a vertical cam disk 58, and encircling a horizontal shaft 59, the inner end of which is rotatively mounted in a bearing 60, secured to the adjacent side of the chamber 1 and the outer end of which is rotatively mounted in a bracket 61 in which the shaft 26 is also rotatively mounted. For rotating the shaft 59 and cam disk 58 the shaft 59 has rigidly secured to it a beveled gear wheel 62, which meshes with a bevel gear wheel 63, rigidly secured on the shaft 26.

In beginning operation with the machine, the operating rock shaft 43 is swung so as to permit the engagement of the pawl 29 carried by the gear 24 to engage the notch 31 of the disk 30. The shaft 5 is then slowly rotated to a position in which the gear 24, now driven by the disk 30, will have its teeth engaged with the gear 25 which will rotate the shaft 26 and the cam disk 58, through the intermediacy of the gears 62 and 63, to a position in which the levers 51 will be in the open position. The ends of the wires 9 are then inserted transversely through the slots 8, by hand, and passed between the jaws 47 and 52. The shaft 5 is then further rotated so as to bring, through the intermediacy of the mechanism already described, the jaws 47 and 52 to the closed position shown in Fig. 15. In this position the wires will be clamped and securely held stretched across the baling chamber 1 in the path of the layers of hay which are inserted through the opening 12 in consecutive charges, and are compressed in bale form by the plunger 2.

In order that the wires 9 shall not obstruct the feed opening 12, of the baling chamber, the following described mechanism is provided:—The two wire holding mechanisms are identical in construction so that a description of one mechanism will suffice for both. Referring to Figs. 1, 2, 5 and 6, and to Figs. 22 and 23 in particular, 64 denotes a substantially horizontal channel shaped plate which is pivotally secured by means of a horizontal screw 65, to the side of the baling chamber 1, to which is secured the shaft 6. The plate 64 is disposed below one of the slots 8 and has mounted in it the substantially horizontal portion of a right angled finger 66 which at its rear end is pivoted upon a vertical pin 67, which extends through suitable holes provided therefor in the outwardly extending flanges of the channel plate 64. The vertical portion of the right angled finger 66 is provided with a forwardly extending horizontal projection 68, adapted to receive thereunder and hold the wire 9, as shown in Fig. 29. A flat spring 69 is secured at its forward end against the forward end of the finger 66 by the screw 65. The rear end of the spring 69 bears against the outer side and rear end of the finger 66 and normally holds the finger 66 in the position shown in Fig. 23. A rod 70 has its rear end secured rigidly to the forward end of the plate 64 and normally extends forwardly and upwardly to a position in which it will be depressed by the adjacent needle 7, so as to swing the plate 64 and the finger 66 to a position in which the projection 68 will engage and hold the wire 9 when the wire 9 is released from the roller 17 upon the plunger 2 being retracted from the position shown in Fig. 31. A vertical coil spring 71 has its lower end mounted on a bracket 72 which is secured to the side of the baling chamber 1, below the rod 70. The upper end of said coil spring bears against the underside of the forward end of the rod 70 and normally holds said rod and finger 66 in the position shown in Fig. 22. In this position the plunger 2 carrying the roller 17, can pass to a position in which the roller 17 will be forward of the projection 68 without the roller striking said projection.

After the ends of the wires 9 have been secured, as has been described, between the clamping jaws 47 and 52, as shown in Fig. 29, the plunger 2 is reciprocated and the charges of hay successively fed into the baling chamber 1 through the feed opening 12. When sufficient hay has been fed into the baling chamber to form a bale the wire 9 will extend across the forward end and along the two sides of the bale, as shown in dotted lines in Fig. 30, the bale forcing the wire to this position. The crank 45 of the rock shaft 43 is then operated to cause the needles 7 to swing through the slots 8 of the baling chamber to the position shown in dotted lines in Fig. 6. As the plunger 2 moves forward from the position shown in solid lines in Fig. 6, the needles 7 will swing through the slots 8 and the slots 16 of the plunger and will engage the two wires 9 in their forked outer ends and will carry said wires between the inclined ends 48 of the jaws 47 and the levers 51 forward of the jaws 52, in which position the wires which have just been folded across the rear end of the bale to the position shown in Fig. 31, will be held but not clamped by the jaws, the ends of the wires, however, will still be clamped as shown in Fig. 15. At this time the plunger 2 and roller 17 will be in the position shown in Fig. 31, with the roller 17 in advance of the projection 68 and the needles 7 in the position shown in Fig. 25. The plunger 2 will now start on its rearward movement and the wires 9 will be caught and held by the projections 68, which at this time are raised to the elevated position by reason of the needles 7 bearing against the upper sides of the rods 70 respectively. By reason of the fingers 66 being mounted on vertical pivots, said fingers can swing outwardly when struck by the rollers 17 on the rearward movement of said rollers. The wires now being bound around the bale are ready to be knotted and cut and released from the clamping jaws so that the bale may be moved forward, as shown in Fig. 32, during the formation of the next succeeding bale.

I will now describe the mechanism which is preferably employed for performing the knotting operations:—Referring particularly to Figs. 1, 3, 7, 8 and 13,—73 denotes two horizontal brackets secured to the side of the baling chamber 1, which is adjacent to the shaft 26. Rotatively mounted in said brackets 73 respectively, are two horizontal shafts 74, to the rear ends of which are secured respectively two disks 75, having respectively secured to their rear sides two bearings 76 in which are respectively rotatively mounted two shafts 77, which are respectively rotatively mounted in two blocks 78, having trunnions 79, best shown in Figs. 8 and 13. Each set of trunnions 79 is pivotally mounted in the vertical arms of two right angled, vertical plates 80, which have their horizontal arms pivoted on a horizontal pin 81. The upper one of the two pins 81 has its ends mounted respectively in two ears 82 which project upwardly from the upper side of a horizontal supporting plate 83, the inner end of which is secured to the adjacent side of the baling chamber 1, as shown in Figs. 8 and 13. The lower pin 81 is mounted in ears or projections 84 which extend upwardly from the upper side of a horizontal plate 85, secured to the adjacent side of the baling chamber 1, below the plate 83. As shown in Fig. 4, each of the bearings 76 is provided with a central, cylindrical extension 86, which is rotatively mounted in the disk 75 and is provided with a screw threaded end on which is mounted a nut 87, disposed at the opposite side of the plate and which secures the bearing 76 to said disk or plate 75. As shown by dotted lines in Figs. 4 and 13, the portion of the shaft 77, which is embraced by the bearing 76, is reduced in diameter so as to prevent lengthwise movement of the shaft relative to the bearing. The end of each shaft 77, adjacent to the baling chamber 1, and at the inner side of the block 78, is larger than the portion of the shaft which extends through the block 78 so that the shaft cannot slip outwardly through said block. To prevent its slipping inwardly through said block each shaft has secured upon it, at the outer side of the block 78, a bevel gear wheel 88, adapted to engage a curved rack 89, which is mounted upon the adjacent side of the adjacent disk 75, when said disk is rotated, in the direction indicated by the arrow in Fig. 13.

Rigidly secured respectively to the shafts 77, at sides opposite from the bearings 76, adjacent to which are secured the gear wheels 88, are two segmental bevel gear wheels 90, which are adapted to respectively mesh with two curved racks 91, secured respectively to adjacent sides of the disks 75. The head or forward end 92 of each shaft 77 is provided at one side with two jaws 93 and 94. Pivotally mounted on the transverse pin 95, secured in the jaw 93, is a tongue 96, which has its inner end normally held against the opposite jaw 94 by a coil spring 97, which is mounted in a recess 98, provided in the inner side of the jaw 93. The baling wire is adapted, when the head 92 is properly positioned, to slip between the jaws 93 and 94 and be held therebetween by means of the tongue 96. When the rock shaft 43 is operated and the shaft 26 is rotated, as has been described, rotation will be imparted to a bevel gear 99, secured on the shaft 26. Rotation will be transmitted from the gear 99 to a bevel gear 100, best shown in Fig. 7 and Fig. 3, which is secured to a vertical shaft 101, which is rotatively mounted in brackets 102, secured respectively to the bearings 73. The shaft 26 is also mounted in a bearing 103, the ends of which are respectively secured to the brackets 102. Rigidly secured on the shaft 101 are two bevel gear wheels 104 which mesh respectively with two bevel gear wheels 105, rigidly secured respectively to the shafts 74. When the shaft 26 is rotated the disks 75 will be rotated in the same direction as each other and in the direction denoted by the arrow in Fig. 13.

When each disk 75 is rotated in the direction specified, at the beginning of the knotting operation, the heads 92 of the shafts 77 will be in the initial position represented in Fig. 28. At this time the gear wheel 90 will have its teeth engaged with the rack 91, as shown in Fig. 13. The rotary movement of the disk 75 will, through the intermediacy of the gear 90 and rack 91, rotate the head 92, to the upright position shown in Fig. 25, and the bearings 76, being moved forward, or toward the baling chamber 1, will force the shaft 77, head 92, block 78, and pivoted plates 80, to the position shown in dotted lines in Fig. 13, which is also the position shown in Fig. 25. At this time the needle 7 will have carried the baling wire to the position shown in Fig. 25, in which position it will be engaged but not clamped by the jaws 47 and 52. The portion of the head 92 having the jaws 93 and 94, will be in the angle formed by the two strands 106 and 107 of the baling wire. Said strands are the two strands located respectively at the adjacent side and rear end of the bale, the side strand 106 being the one which is clamped by the jaws 47 and 52. Continued rotation of the disk 75 will force the head 92 away from the baling chamber 1, after which the rack 89 will engage the segmental gear 88 and will rotate said gear and the adjacent head 92 clockwise to the position shown in Fig. 26 and then to and a little way past the position shown in Fig. 27. During this time the strand 107 will be formed into a loop, denoted by 108, in Figs. 27 and 28. In the meantime, the strand 106, intermediate the jaw 47 and strand 107, has been gripped by a device provided therefor and which I will hereinafter describe, and drawn over the strand 107, and between the jaws 93 and 94 past the tongue 96, as shown in Fig. 27. In the meantime, the jaws 47 and 52 have assumed the open position, shown in dotted lines in Fig. 15, thereby permitting the strand 107 to slip between the jaws and releasing the strand 106 from said jaws. Continued rotation of the disk 75 will cause the rack 89 to disengage from the gear 88, after which the segmental gear 90 will be engaged by the rack 91 which will rotate the head 92 in a direction opposite to clockwise movement from the position shown in Fig. 27 to that shown in Fig. 28, which is the initial or starting position. With the head 92 in this position the loop 108 will slip therefrom and the strand 106 being engaged by the tongue 96 will slip through the loop 108 when the loop slips from the jaws 93 and 94, thereby forming the knot which is shown in Fig. 33. At this time the strand 107 will be disengaged from the gripping device heretofore referred to, and which I am about to describe, the jaw 52 having in the meantime moved to the closed position shown in solid lines in Fig. 15 and thereby having cut the wire. When the shaft 26 has ceased rotating and the knot has been tied and the wire cut, the parts will have assumed the position shown in Fig. 13 in solid lines, with the gear 90 still in mesh with the rack 91.

I will now describe the mechanism by which strand 106 is drawn over the strand 107 and between the jaws 93 and 94 past the tongue 96:—Referring particularly to Figs. 1, 4, and 7 to 12, 109 denotes two brackets secured respectively to the upper and lower sides of the plate 83. Two horizontal shafts 110 are rotatively mounted in bearings 111 respectively, which are respectively secured to the brackets 109. Secured to the shafts 110 respectively are two vertical plates 112, to which are eccentrically pivoted the outer ends respectively of two bars 113 upon which are respectively secured two collars 114, provided each with a downwardly extending projection 115 in which is pivotally mounted the crank arm 116 of a rock shaft 117, which is rotatively mounted in the adjacent bracket 109 and a vertical bracket 118, secured to the adjacent side of the plate 83. A horizontal stud 119 is secured to the upper bracket 118 and has pivotally mounted on it a segmental spur gear 120, having a radial arm 121, which is pivoted to one end of the link 122, the other end of which is pivoted to the lower end of a lever 123, the upper end of which is pivoted to the bracket 118 mounted on the upper side of the plate 83. A link 124 has one end pivoted to the lever 123 and the other end pivoted to a crank 125, with which the shaft 26 is provided.

Two cranks 126 are respectively secured to the rock shaft 117. A vertical rod 127 is pivotally connected at its respective ends to the cranks 126. When the shaft 26 is rotated it will, by means of its crank 125, oscillate the segmental gear 120, through the intermediacy of the link 124, lever 123, link 122, and arm 121. Oscillation of the segmental gear 120 will oscillate the upper of the two rock shafts 117 through the intermediacy of a spur gear wheel 128, secured on said shaft and meshing with the segmental gear 120. The upper shaft 117 being oscillated will transmit oscillation to the lower rock shaft 117 through the intermediacy of the cranks 126 and rod 127. The rock shaft 117 being oscillated will respectively oscillate the plates 112 through the intermediacy of the projections 115, collars 114 and bars 113. Each bar 113 is provided with two upwardly extending ears 129, located at the end of the bar adjacent to the baling chamber 1. Two bars 130, are respectively pivotally mounted adjacent their inner ends, upon transverse pins 131, secured in the ears 129. Each bar 130 is provided at its inner end with a downwardly extending jaw 132, which coöperates with a similar jaw 133, with which each bar 113 is provided at its inner end. The inner side of each jaw 132 is provided with a tooth 134, best shown in Fig. 12 and which is adapted to enter a recess 135, provided on the inner side of the adjacent jaw 133. The bars 130 extend outwardly over the bars 113 and are provided at their outer ends respectively with right angled bent portions on which are respectively mounted two rollers 136. On the sides of the plate 112, adjacent to the bars 130, are provided two cam projections 137, with which the rollers 136 are adapted to respectively engage. When the parts are in the initial position shown in Fig. 9, and in solid lines in Fig. 10, the rollers 136 lie respectively between the cam projections 137 and two pivoted guiding plates 138, which are respectively pivoted to the plates 112 on the sides of the plates provided with the cam projections 137. Two springs 139, which are respectively secured to the plates 112, bear against the pivoted plates 138 and retain said plates in contact with the cam projections 137 excepting at such times as the rollers 136 are forced upwardly through said cam projections and said pivoted plates. When the shaft 26 is rotated the plates 112 are oscillated, first to the position shown in dotted lines in Fig. 10, then to the position shown in solid lines in Fig. 11, then to the position shown in dotted lines in Fig. 11, and finally to the initial position shown in solid lines in Fig. 9.

After the operating rock shaft 43 has been rocked, so as to swing the needles 7 across the baling chamber and the knotter head 92 has been operated to engage the strand 107, as shown in Fig. 26, the crank 125 on the shaft 26, will cause the plates 112 to be oscillated, as described, thereby causing the bars 113 and 130 to be moved first to the position shown in solid lines in Fig. 10. The plates 138 and 137 will swing the bars 130 so as to close the jaws 132 and 133 from the open initial position, shown in Fig. 9. Prior to this time the oscillation of the plates 112 from the position shown in solid lines in Fig. 10 to the position shown in dotted lines in said figure, will cause the jaws 132 and 133 to be moved while in the open position, downwardly, and toward the baling chamber 1, to a position in which the strand 106 will pass between the jaws above the tooth 134. When the plate 112 has reached a position shown in dotted lines in Fig. 10, the rollers 136 will have passed upwardly between the cam projections 137 and plates 138 and the plates 138 will, by striking against said rollers, swing the bars 130 to the closed position shown in dotted lines in Fig. 10, thereby clamping the strands 106 between said jaws. At this time the plates 112 will begin to swing in the opposite direction, and when they have swung to the position shown in solid lines in Fig. 11, the jaws 132 and 133 will have carried the strands 106 upward to a position in which the jaws will clear the strand 107, after which the jaws will be moved outward from the baling chamber 1, carrying with them the strands 106 to the position shown in Fig. 27 and in dotted lines in Fig. 11. During this movement the rollers 136 will pass over the outer edges of the cam projections 137 and will thereby be held in positions in which the jaws 132 and 133 will remain closed. At about this time the levers 51 will have been swung to the open position, thereby releasing the strands 106 from the jaws 47 and 52, and the knotter heads 92 will have been rotated, clockwise, to the position shown in Fig. 27, in which position the strands 106 will have passed between the jaws 93 and 94 past the tongues 96 of the knotter heads 92. The knotter heads 92 will now begin their reverse movement from the position shown in Fig. 27 to that shown in Fig. 28. When they have reached the position shown in Fig. 28, the plates 112 will have been rocked from the position shown in dotted lines in Fig. 11 to the initial position shown in Fig. 9 and in solid lines in Fig. 10, in which latter position the jaws 132 and 133 will have been moved to the open position. Two projections 140, are provided respectively on the plates 112 and serve, when the said plates reach the position shown in dotted lines in Fig. 10, to respectively strike the undersides of the bars 130, thereby limiting the oscillation, in that direction, of the plates 112.

From the foregoing, it will be understood that the mechanisms are so timed that after a bale has been formed and the shaft 43 is rocked in the proper direction, the needles 7, on the next forward movement of the plunger 2, will be swung across the baling chamber 1 through the slots 8 and the slot 16 of the plunger and will engage and carry the wires 9 across the baling chamber to the rear of the formed bale and will deposit said wires under the jaws 47. At this time the knotter heads 92 will move into the position shown in Fig. 25 and will then be rotated clockwise to the position shown in Fig. 26, at which time the bars 113 and 130 will advance and will carry the jaws 132 and 133 toward the baling chamber and downward, where they will grip the strands 106 and will then draw the strands away from the baling chamber over the strands 107 to the position shown in Fig. 27, prior to which the levers 51 have been swung so as to release the strands 106 and to clamp the strands 107. In the meantime, the knotter heads 92 will, by their jaws 93 and 94 and tongues 96, have engaged the strands 106, as shown in Fig. 27, subsequent to which the knotter heads 92 will reverse their movement, thereby drawing the strands 106 from between the jaws 132 and 133, and will pass to the position shown in Fig. 28, in which position the loops 108 will slip from the knotter heads thus drawing the strands 106 through the loops 108 and completing the knots. At this time the cam disk 58 will have rotated to a position in which the levers 51 will be swung to close the jaws 47 and 52, thereby cutting the strands 107 and permitting the tied bale to be ejected from the baling chamber. When the jaws 47 and 52 cut the strands 107, one part of each of said strands will be held clamped between the jaws. At this time the parts will have reached their initial positions, the plunger 2 having made one complete reciprocation in the same period of time consumed by each needle in completing an oscillation. Further operation of the knotting mechanism will now be suspended until the operating shaft 43 has again been rocked after another bale has been formed.

By first knotting the wires and then cutting the strands intermediate the knots and the rolls, the wires are securely held and are not liable to slip from the knotting mechanism, but are held under perfect control until the knots are formed.

It is a great advantage to have the knots formed in the wires as far forward of the rear end of the bale and as near to the middle of the bale as is possible, in order to leave as little slack as possible to be taken up by the expansion of the bale. For this reason I have provided means by which the wire after being passed across the baling chamber is carried forward of the rear end of the bale in making the knots. The needles 7 by reason of their curved shape and of their pivotal movement first engage the wire with the wire holding jaws and then carry the wire forward where it is taken by the knotter head by which it is carried still farther forward along side of the bale during the knotting operation. To effect this the knotter heads 92 are mounted upon shafts 77, which as shown in Fig. 8 have imparted to them a reciprocating movement in a line which extends forwardly and outwardly from the side of the baling chamber. This construction permits the knotter heads 92 to take the wires from the needles 7 and carry them forward as well as outward during the knotting operation.

I do not limit my invention to the structure illustrated and described, as various modifications, within the scope of the appended claims, may be made without departing from its spirit.

Having thus described my invention, what I claim and desire to secure by Letters Patent, is:—

1. In baling machines, the combination with a reciprocative plunger having a longitudinal slot extending transversely through its forward end, of a pivoted needle, and means for oscillating the needle through said slot as the plunger is reciprocating, an oscillation of the needle consuming the same time as a reciprocation of the plunger.

2. In baling machines, the combination with a reciprocative plunger having a longitudinal slot extending transversely through its forward end, of a pivoted needle having means at its free end for engaging a binding wire and having a concave side across which is adapted to be stretched the portion of a binding wire which embraces the rear end of a bale, and means for oscillating the needle through said slot during a reciprocation of the plunger, an oscillation of the needle consuming the same time as a reciprocation of the plunger.

3. In baling machines, the combination with a reciprocative plunger having a plurality of slots extending transversely through the forward end of the plunger, of a plurality of needles, and means for oscillating the needles respectively through said slots when the plunger is reciprocated, an oscillation of the needles consuming the same time as a reciprocation of the plunger.

4. In baling machines, the combination with a baling chamber having slots in its opposite sides, of a plunger reciprocative in said chamber and having a longitudinal slot extending transversely through its forward end, a pivoted needle, and means for oscillating said needle to and fro through the slots in the baling chamber and plunger, as the plunger is reciprocated, an oscillation of the needle consuming the same time as a reciprocation of the plunger.

5. In baling machines, the combination with a rotary driving shaft, of a plunger having in its forward end a longitudinal slot extending transversely therethrough, means actuated by the shaft for reciprocating the plunger, and manually controlled means by which the shaft in rotating oscillates the needle through said slot when the plunger is reciprocating, an oscillation of the needle consuming the same time as a reciprocation of the plunger.

6. In baling machines, the combination with a rotary driving shaft, of a plunger having a longitudinal slot extending transversely through its forward end, means actuated by the shaft for reciprocating the plunger, a rock shaft, a needle carried by said rock shaft, and manually controlled means by which the driving shaft in rotating will rock the rock shaft to and fro thereby oscillating the needle through said slot when the plunger is moving forward and backward.

7. In baling machines, the combination with a rotary driving shaft, of a plunger, means actuated by the shaft for reciprocating the plunger, a baling chamber in which the plunger is reciprocative provided with slots in opposite walls, a needle movable transversely across said baling chamber through said slots, a rotary member, means actuated by said rotary member for oscillating said needle, an oscillation of the needle consuming the same time as a reciprocation of the plunger, and manually controlled means for transmitting rotation of said shaft to said rotary member.

8. In baling machines, the combination with a rotary driving shaft, of a baling chamber having slots in opposite sides, a plunger reciprocative in said baling chamber, means actuated by said shaft for reciprocating the plunger, a rock shaft, a needle carried by the rock shaft and oscillative through said slots, a rotary member, means actuated by the rotary member for rocking said rock shaft, and manually controlled means for transmitting rotation from the driving shaft to the rotary member.

9. In baling machines, the combination with a driving shaft, of a baling chamber, a plunger reciprocative in the baling chamber, means actuated by the shaft for reciprocating the plunger, a needle oscillative transversely through the baling chamber, two rotary members, one of which is rotative with said shaft, means actuated by the other rotary member for oscillating said needle, connecting means for transmitting rotation from one rotary member to the other, and manually controlled means for rendering said connecting means inoperative.

10. In baling machines, the combination with a rotary driving shaft, of a plunger, means actuated by the shaft for reciprocating the plunger, an oscillative needle, a baling chamber in which the plunger is reciprocative and through which the needle is oscillative, two rotary members, one of which is rotative with said shaft, means actuated by the other rotary member for oscillating the needle, a pawl mounted on one rotary member for engaging the other member to releasably lock said members together, and manually controlled means for normally holding the pawl out of operative position.

11. In baling machines, the combination with a rotary driving shaft, of a baling chamber, a plunger reciprocative in the chamber, means actuated by the shaft for reciprocating the plunger, two rotary members one rotative with the shaft, a needle, means actuated by the other rotary member for oscillating the needle transversely through said chamber, a pawl carried by one rotary member for engaging the other rotary member for locking the two members together, a spring for normally forcing the pawl into operative position, and manually controlled means for normally forcing the pawl to an inoperative position.

12. In baling machines, the combination with a rotary driving shaft, of a baling chamber having slots in opposite walls, a plunger in said chamber, means actuated by the shaft for reciprocating the plunger, a rock shaft, a needle carried by the rock shaft and oscillative through said slots, two rotary members one rotative with the driving shaft, means actuated by the other member for rocking the rock shaft, releasable means for locking together the two rotary members, and manually controlled means for normally rendering the locking means inoperative.

13. In baling machines, the combination with a rotary driving shaft, of an oscillatory needle, a baling chamber through which the needle is transversely oscillative, two rotary members one rotative with the shaft, means actuated by the other member for oscillating the needle, a pawl carried by one rotary member for engaging and locking together the two rotary members, a spring for forcing the pawl into operative position, and manually controlled means for normally holding the pawl out of operative position.

14. In baling machines, the combination with a baling chamber, of a plunger reciprocative therein and having means for engaging and carrying forward the baling wire, an oscillative needle for carrying the baling wire transversely through the baling chamber, and a device controlled by the needle for engaging and holding the wire carried forward by the plunger.

15. In baling machines, the combination with a baling chamber, of a plunger reciprocative therein and having means for engaging and carrying forward the baling wire, a device pivoted to the chamber for engaging and holding the wire so carried, and an oscillative needle for carrying the wire transversely through the baling chamber and controlling said device.

16. In baling machines, the combination with a baling chamber having a longitudinal slot in one side wall, of a plunger reciprocative in said chamber and provided with a longitudinal slot extending transversely through its forward end, a roller carried by said plunger in the slot thereof for engaging and carrying forward the baling wire, an oscillative needle for carrying the baling wire transversely through said slots, means for oscillating the needle as the plunger reciprocates, a wire engaging device movable by the needle to a position in which it will engage and hold the baling wire carried forward by the roller, and means for normally forcing said device from said position.

17. In baling machines, the combination with a baling chamber, of a plunger reciprocative therein, a roller carried by the plunger for engaging and carrying forward the baling wire, an oscillative needle for carrying the baling wire transversely through the baling chamber, a member pivoted to the chamber and movable in one direction by the needle, means for moving said member in the opposite direction, and means carried by said member for engaging and holding the baling wire which has been carried forward by the roller, said means moving into operative position when the needle swings said pivoted member.

18. In baling machines, the combination with a baling chamber having a longitudinal slot, of a plunger reciprocative in said chamber, a roller carried by said plunger and projecting through said slot, a wire engaging finger movable across said slot into the path of said roller for holding baling wire carried forward by the roller, a member pivoted to the chamber and to which the finger is pivoted to move laterally when struck by said roller, an oscillative needle for carrying the wire transversely through said slot, and when so doing swinging said member to a position in which the finger will be in the path of movement of said roller, and means for swinging said member in the opposite direction.

19. In baling machines, the combination with means for drawing wire from a roll and binding it around a bale, of means for knotting together the meeting strands of the wire, and means operative after the knot has been tied for cutting the wire intermediate the knot and roll.

20. In baling machines, the combination with two jaws one pivoted to the other, the jaws having means by which when the pivoted jaw is oscillated between an open and closed position a binding wire inserted between the jaws when the jaws are in the open position will be severed and one portion clamped between the jaws and the other portion freed from the jaws, of means for swinging the pivoted jaw first to the open, then to the closed and finally to the open position, binding means, knotting means, and timing means whereby the binding, knotting and wire cutting and clamping means coöperate.

21. In baling machines, the combination with wire cutting and clamping means, of knotting means, and timing means controlling the operation of the cutting and clamping means, and knotting means, by which the binding wire is clamped, then knotted and then severed.

22. In baling machines, the combination with wire cutting and clamping means having means by which when a wire is cut one portion will be clamped and the other freed, of knotting means, and means controlling the wire cutting and clamping and knotting means by which the wire is clamped, then knotted, and then severed intermediate the clamped and knotted portions.

23. In baling machines, the combination with means for binding a wire around a bale, of wire cutting means, knotting means, and means controlling the binding, cutting and knotting means by which the wire is first bound around the bale, then knotted, and then severed.

24. In baling machines, the combination with wire holding and positioning means, of a rotary knotter head having two jaws and wire engaging means intermediate the jaws, and means for rotating the knotter head first in one direction whereby one portion of the wire held by the holding and positioning means is formed in a loop around the jaws and another portion is engaged by the engaging means intermediate the jaws, and then rotating the knotter head in the opposite direction, whereby when the loop portion is slipped from the jaws, the other portion will be drawn through the loop by the wire engaging means to form a knot.

25. In baling machines, the combination with a rotary knotter head having two jaws and a wire engaging tongue intermediate the jaws, of wire holding and positioning means, and means for rotating the knotter head so as to form a loop in one portion of the wire held by the holding and positioning means, and to engage another portion of the wire by said tongue and dispose said latter portion transversely across the loop.

26. In baling machines, the combination with wire cutting and clamping means, of a rotary knotter head having means by which when it is rotated in the proper directions a loop will be formed in the wire held by the clamping means in one portion of the wire and another portion of the wire will be drawn through the loop to form a knot, and timing means by which the wire is first clamped by the clamping means, then knotted by the rotation of the knotter head, and then severed intermediate the loop and clamped portion by the cutting means.

27. In baling machines, the combination with means for carrying a wire across the rear end of a bale, of a forwardly and rearwardly movable knotter by which the wire so carried is engaged and carried forward of the rear end of the bale prior to the knotting operation.

28. In baling machines, the combination with means for withdrawing wire from a roll and carrying it around a bale, of means for forming a knot in the wire at a point intermediate of two adjacent corners of the bale, and means for cutting the wire between the knot so formed and the roll.

29. In baling machines, the combination with means for withdrawing wire from a roll and carrying it around a bale, of means for forming a knot in the wire at a point intermediate of two adjacent corners of the bale, and means operative after the knot has been formed for cutting the wire intermediate of the knot and the roll.

30. In baling machines, the combination with wire holding means, of means for folding a wire across the rear end of a bale with one portion of the folded wire above the other portion, the folding means having means for depositing one portion of the wire in the holding means and for carrying the other portion forward, and knotting means for knotting the portion which is carried forward.

31. In baling machines, the combination with wire holding means, of a needle having means for folding a wire with one portion disposed higher than the other, and means for moving the needle past the wire holding means, the wire holding means being disposed so as to engage and hold one of said wire portions carried by the needle.

32. In a baling machine, the combination with wire holding means, of a needle for holding a folded wire with one portion disposed higher than the other, means for moving the needle past the said holding means, the holding means being disposed so as to engage and hold one of said portions of the wire, and knotting means for engaging the other portion of the wire.

33. In baling machines, a wire holding and cutting device having two jaws movable relative to each other to open and closed positions, the jaws in the closed position having means for engaging and holding a piece of wire between them, the jaws having clamping faces and cutting edges, the said holding means and clamping faces and cutting edges being so related that when the jaws are opened the wire may pass from the holding means to a position between the clamping faces and cutting edges, and when the jaws are closed the wire will be severed and one severed piece held clamped between the jaws, and means for passing a wire between the jaws when the jaws are in the closed position.

In testimony whereof I have signed my name to this specification in presence of two subscribing witnesses.

ELMER R. KOONTZ.

Witnesses:
R. L. HUGHES,
J. H. PARRISH.